US012683747B2

(12) United States Patent
Zhang et al.

(10) Patent No.: US 12,683,747 B2
(45) Date of Patent: Jul. 14, 2026

(54) RULES FOR INTERFERENCE MITIGATION COORDINATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 477 days.

(21) Appl. No.: 17/583,846

(22) Filed: Jan. 25, 2022

(65) Prior Publication Data

US 2023/0291529 A1      Sep. 14, 2023

(51) Int. Cl.
*H04L 5/00*          (2006.01)
(52) U.S. Cl.
CPC .......... *H04L 5/0064* (2013.01); *H04L 5/0051* (2013.01); *H04L 5/006* (2013.01)
(58) Field of Classification Search
CPC ...... H04L 5/0064; H04L 5/006; H04L 5/0051
See application file for complete search history.

(56) References Cited

U.S. PATENT DOCUMENTS

| | | | |
|---|---|---|---|
| 2016/0352447 A1* | 12/2016 | Koutsimanis | ......... H04W 24/02 |
| 2019/0181922 A1* | 6/2019 | Lee | ...................... H04B 7/0626 |
| 2019/0274155 A1* | 9/2019 | Bhattad | ................. H04L 5/0073 |
| 2020/0112420 A1* | 4/2020 | Xu | ........................ H04L 5/0073 |
| 2020/0274687 A1* | 8/2020 | Kim | ...................... H04L 5/0096 |
| 2022/0014954 A1* | 1/2022 | Ibrahim | ................ H04W 72/21 |
| 2022/0116898 A1* | 4/2022 | Ying | .................. H04W 56/005 |
| 2022/0174528 A1* | 6/2022 | Sedin | .................... H04W 24/08 |
| 2022/0191724 A1* | 6/2022 | Hwang | ................ H04B 17/336 |

OTHER PUBLICATIONS

H. Kim, J. Kim and D. Hong, "Dynamic TDD Systems for 5G and Beyond: A Survey of Cross-Link Interference Mitigation," in IEEE Communications Surveys & Tutorials, vol. 22, No. 4; URL:https://ieeexplore.ieee.org/stamp/stamp.jsp?tp=&arnumber=9139384 &isnumber=9265420 (Year: 2020).*

* cited by examiner

*Primary Examiner* — Jackie Zuniga Abad
(74) *Attorney, Agent, or Firm* — Patterson & Sheridan, LLP

(57)          ABSTRACT

Certain aspects of the present disclosure provide techniques for wireless communication by a first wireless node, comprising detecting cross link interference (CLI) between the first wireless node and a second wireless node, determining whether the first wireless node or the second wireless node is to take action to mitigate CLI based on one or more rules and taking one or more actions to mitigate CLI when the determination is that the first wireless node is to take action to mitigate CLI.

18 Claims, 14 Drawing Sheets

400
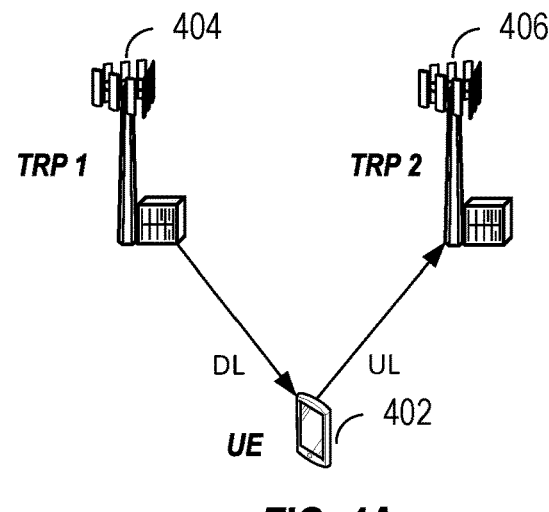
404
406
TRP 1
TRP 2
DL
UL
402
UE
FIG. 4A
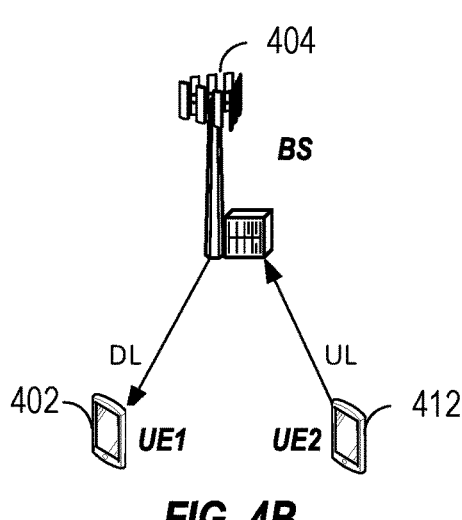
404
BS
DL
UL
402
UE1
UE2
412
FIG. 4B
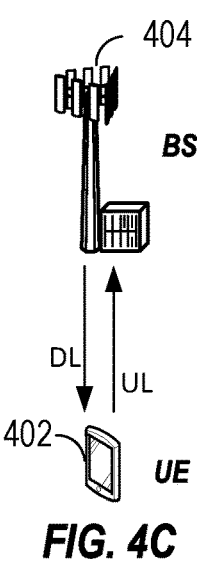
404
BS
DL
UL
402
UE
FIG. 4C

500

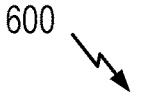
600
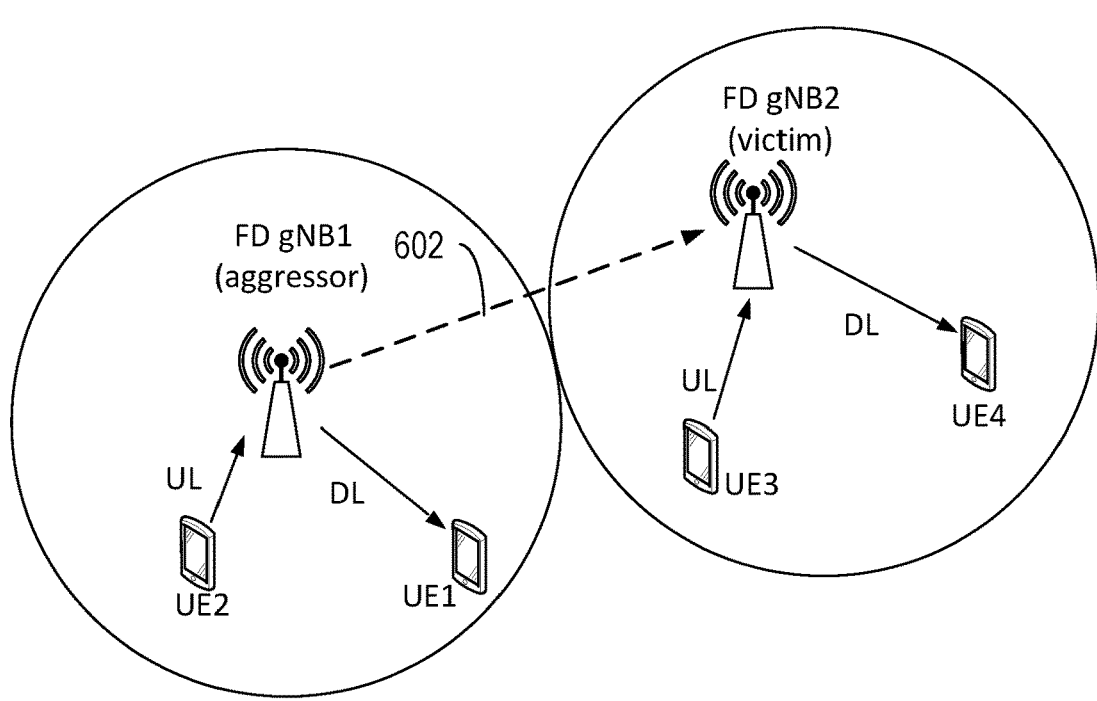
FD gNB2
(victim)
FD gNB1          602
(aggressor)
DL
UL
UE4
UL          DL
UE3
UE2          UE1
FIG. 6A
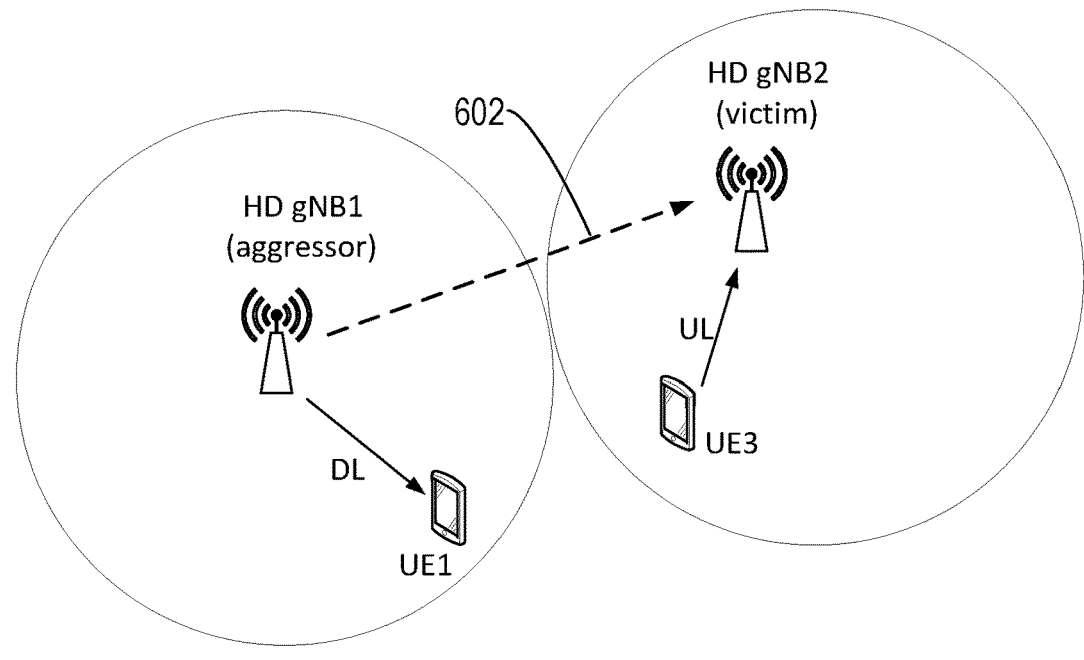
HD gNB2
(victim)
602
HD gNB1
(aggressor)
UL
UE3
DL
UE1
FIG. 6B

700

VICTIM

AGGRESSOR

Detect cross-link
interference (CLI) — 706

708 — CLI notification →

710

Determine which node takes action,
based on one or more rules

712a — 712b —

Take action to
mitigate CLI
according to the
determination — — OR — — Take action to
mitigate CLI
according to the
determination

| RRC configured symbol for Aggressor gNB | RRC configured symbol for Victim gNB | gNB Action |
|---|---|---|
| D | F | Victim terminates transmission |
| U | F | Victim terminates reception |
| F | D | Aggressor terminates transmission |
| F | U | Aggressor terminates reception |

Both Aggressor gNB and Victim gNB have RRC configured symbol F

| SFI for Aggressor gNB | SFI for Victim gNB | gNB Action |
|---|---|---|
| D | N/A | Victim terminates transmission |
| U | N/A | Victim terminates reception |
| N/A | D | Aggressor terminates transmission |
| N/A | U | Aggressor terminates reception |

*FIG. 9*

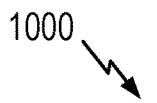

1000

```
┌─────────────────┐              ┌─────────────────┐
│     VICTIM      │              │   AGGRESSOR     │
└─────────────────┘              └─────────────────┘
         │                                │
┌─────────────────┐                       │
│ Detect cross-link│                      │
│interference (CLI)│                      │
└─────────────────┘                       │
         │                                │
         │        CLI notification        │
         │───────────────────────────────▶│
         │                                │         ┌──── 1010
    ╭────┴────────────────────────────────┴───╮
    │  Determine which node takes action,      │
    │  based on priorities and/or cell IDs     │
    ╰────┬────────────────────────────────┬───╯
         │                                │
┌─────────────────┐              ┌─────────────────┐
│  Take action to │              │  Take action to │
│  mitigate CLI   │─ ─ OR ─ ─ ─ ─│  mitigate CLI   │
│ according to the│              │ according to the│
│   determination │              │   determination │
└─────────────────┘              └─────────────────┘
         │                                │
```

*FIG. 10*

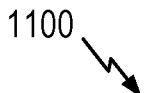

1100

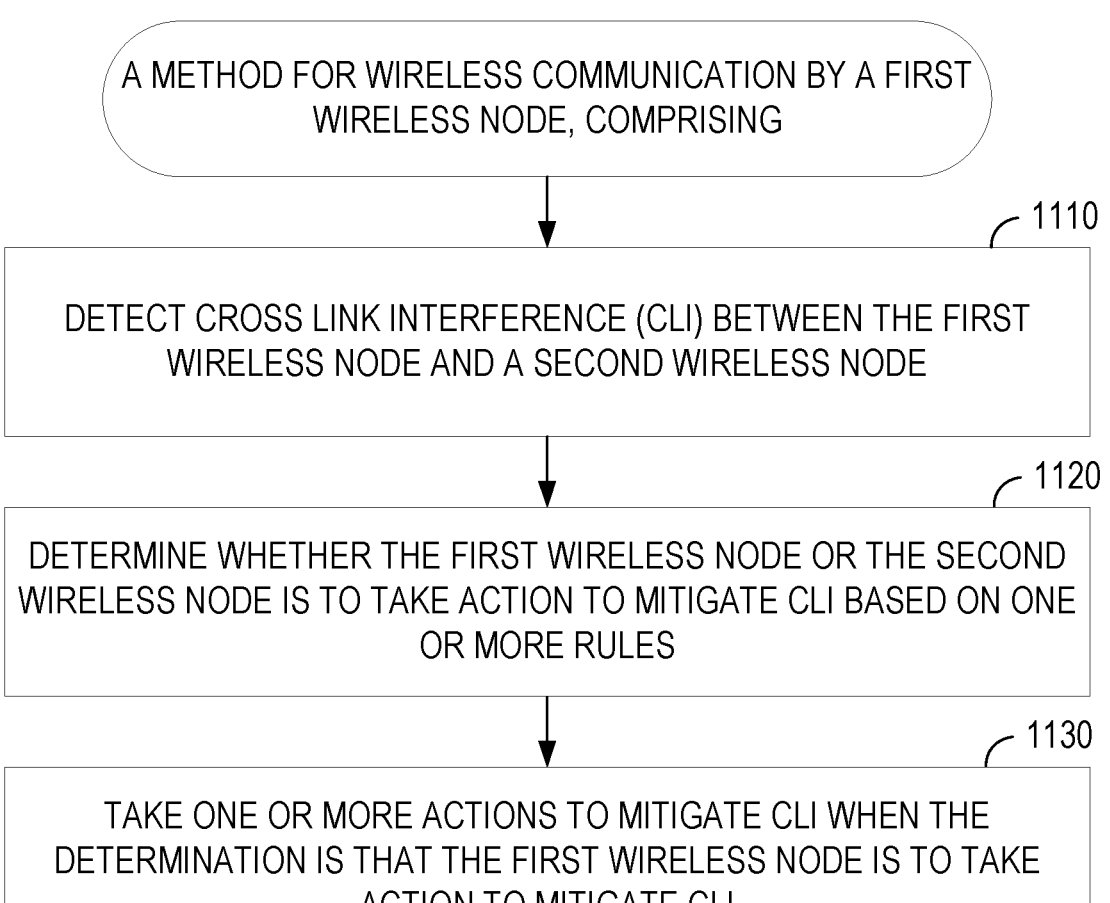

A METHOD FOR WIRELESS COMMUNICATION BY A FIRST WIRELESS NODE, COMPRISING

1110

DETECT CROSS LINK INTERFERENCE (CLI) BETWEEN THE FIRST WIRELESS NODE AND A SECOND WIRELESS NODE

1120

DETERMINE WHETHER THE FIRST WIRELESS NODE OR THE SECOND WIRELESS NODE IS TO TAKE ACTION TO MITIGATE CLI BASED ON ONE OR MORE RULES

1130

TAKE ONE OR MORE ACTIONS TO MITIGATE CLI WHEN THE DETERMINATION IS THAT THE FIRST WIRELESS NODE IS TO TAKE ACTION TO MITIGATE CLI

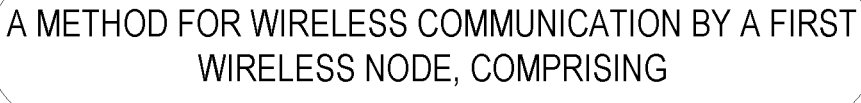

A METHOD FOR WIRELESS COMMUNICATION BY A FIRST WIRELESS NODE, COMPRISING

1210

DETECT CROSS LINK INTERFERENCE (CLI) BETWEEN THE FIRST WIRELESS NODE AND A SECOND WIRELESS NODE

1220

DETERMINE WHETHER THE FIRST WIRELESS NODE OR THE SECOND WIRELESS NODE IS TO TAKE ACTION TO MITIGATE CLI BASED ON BASED ON A COMPARISON OF A CELL IDENTIFIERS (CELL IDS) OR PHYSICAL CELL IDENTIFIERS (PCIS) OF THE FIRST AND SECOND WIRELESS NODES

1230

TAKE ONE OR MORE ACTIONS TO MITIGATE CLI WHEN THE DETERMINATION IS THAT THE FIRST WIRELESS NODE IS TO TAKE ACTION TO MITIGATE CLI

*FIG. 12*

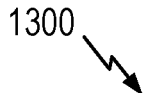

1300

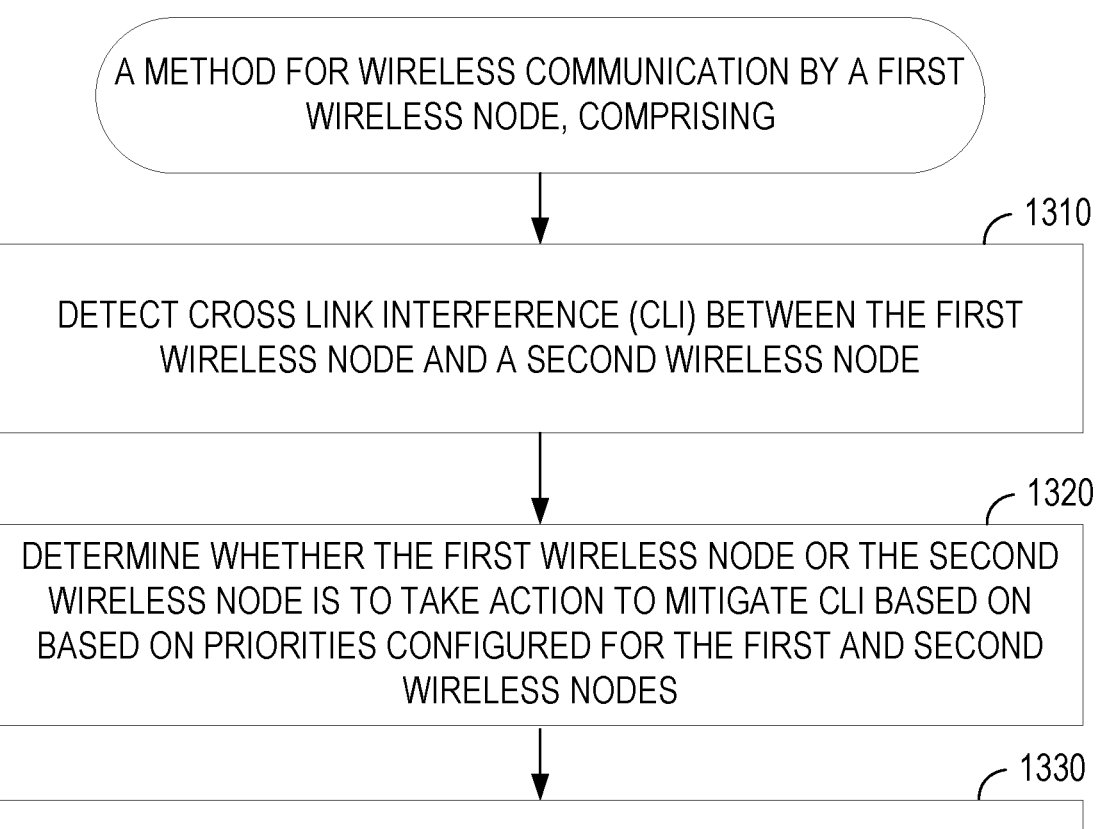

A METHOD FOR WIRELESS COMMUNICATION BY A FIRST WIRELESS NODE, COMPRISING

1310

DETECT CROSS LINK INTERFERENCE (CLI) BETWEEN THE FIRST WIRELESS NODE AND A SECOND WIRELESS NODE

1320

DETERMINE WHETHER THE FIRST WIRELESS NODE OR THE SECOND WIRELESS NODE IS TO TAKE ACTION TO MITIGATE CLI BASED ON BASED ON PRIORITIES CONFIGURED FOR THE FIRST AND SECOND WIRELESS NODES

1330

TAKE ONE OR MORE ACTIONS TO MITIGATE CLI WHEN THE DETERMINATION IS THAT THE FIRST WIRELESS NODE IS TO TAKE ACTION TO MITIGATE CLI

RULES FOR INTERFERENCE MITIGATION COORDINATION

INTRODUCTION

Aspects of the present disclosure relate to wireless communications, and more particularly, to techniques for mitigating cross-link interference (CLI) between wireless nodes by implementing one or more action rules.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a first wireless node, comprising detecting cross link interference (CLI) between the first wireless node and a second wireless node. The method may include determining whether the first wireless node or the second wireless node is to take action to mitigate CLI based on one or more rules. The method may include taking one or more actions to mitigate CLI when the determination is that the first wireless node is to take action to mitigate CLI.

One aspect provides a method for wireless communication by a first wireless node, comprising detecting CLI between the first wireless node and a second wireless node. The method may include determining whether the first wireless node or the second wireless node is to take action to mitigate CLI based on based on a comparison of a cell identifiers (cell IDs) or physical cell identifiers (PCIs) of the first and second wireless nodes. The method may include taking one or more actions to mitigate CLI when the determination is that the first wireless node is to take action to mitigate CLI.

One aspect provides a method for wireless communication by a first wireless node, comprising detecting CLI between the first wireless node and a second wireless node. The method may include determining whether the first wireless node or the second wireless node is to take action to mitigate CLI based on based on priorities configured for the first and second wireless nodes. The method may include taking one or more actions to mitigate CLI when the determination is that the first wireless node is to take action to mitigate CLI.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4A, FIG. 4B, and FIG. 4C depict different use cases for full-duplex (FD) communications, in which aspects of the present disclosure may be utilized.

FIG. 6A and FIG. 6B depict cross-link interference (CLI) for FD and flexible time division duplex (TDD) communications, in which aspects of the present disclosure may be utilized.

FIG. 8 is a table illustrating rules for implementing CLI interference mitigation procedures in FD communications based on radio resource control (RRC) configured symbol.

FIG. 9 is a table illustrating rules for implementing CLI interference mitigation procedures in FD communications based on a slot form indicator (SFI) associated with transmission.

FIG. 10 is a call flow diagram illustrating example signaling between a victim node and aggressor node, where one of the nodes takes actions based on a priority/cell identifier.

FIG. 11 illustrates example operations for wireless communications by a first wireless node, in accordance with certain aspects of the present disclosure.

FIG. 12 illustrates example operations for wireless communications by a first wireless node, in accordance with certain aspects of the present disclosure.

FIG. 13 illustrates example operations for wireless communications by a first wireless node, in accordance with certain aspects of the present disclosure.

DETAILED DESCRIPTION

Aspects of the present disclosure provide apparatuses, methods, processing systems, and computer-readable mediums for mitigating cross-link interference (CLI) between wireless nodes by implementing one or more action rules during full-duplex (FD) communication.

In current wireless systems, FD communication may be implemented to allow simultaneous uplink (UL) and downlink (DL) transmissions between a gNB (e.g., a base station) and a user equipment (UE). As a result, FD communication may reduce latency in a wireless network, for example, by making it possible to receive DL signals in what would conventionally be considered UL only slots. FD communication may also enhance spectrum efficiency and streamline overall resource utilization.

Interference during FD communication may inhibit the speed and quality of wireless communication, and may come in the form of CLI from other neighboring nodes or self-interference (SI) of a single node. When CLI or SI interferes with DL/UL FD communications, the interference may create clutter echo during FD communication (generally referring to unwanted echoes/reflected signals that interfere with signals of interest).

There are various techniques for mitigating interference between wireless nodes operating in a FD wireless network. For example, one of the wireless nodes referred to as an aggressor (because its transmissions cause interference) could refrain from transmitting for some time period to avoid interfering with downlink reception by the other wireless node referred to as a victim. As another example, the victim could refrain from receiving for a period of time (e.g., during expected transmissions from the aggressor).

Unfortunately, in current wireless systems (e.g., 5G NR systems), there is typically little or no coordination between nodes regarding mitigation actions. As a result, each wireless node may independently take action, which may be less than ideal. For example, if an aggressor refrains from transmission, the victim could be able to receive on the downlink without interference. Thus, if the victim also refrains from receiving during this same period, over the air resources are wasted.

Aspects of the present disclosure, however, provide dynamic interference mitigation rules that may help wireless nodes coordinate interference mitigation efforts. The rules may define which of the wireless nodes is to take action. The resulting coordination may help improve interference mitigation, resulting in better system performance, and may also lead to more efficient use of resources.

Introduction to Wireless Communication Networks

Figure 1:
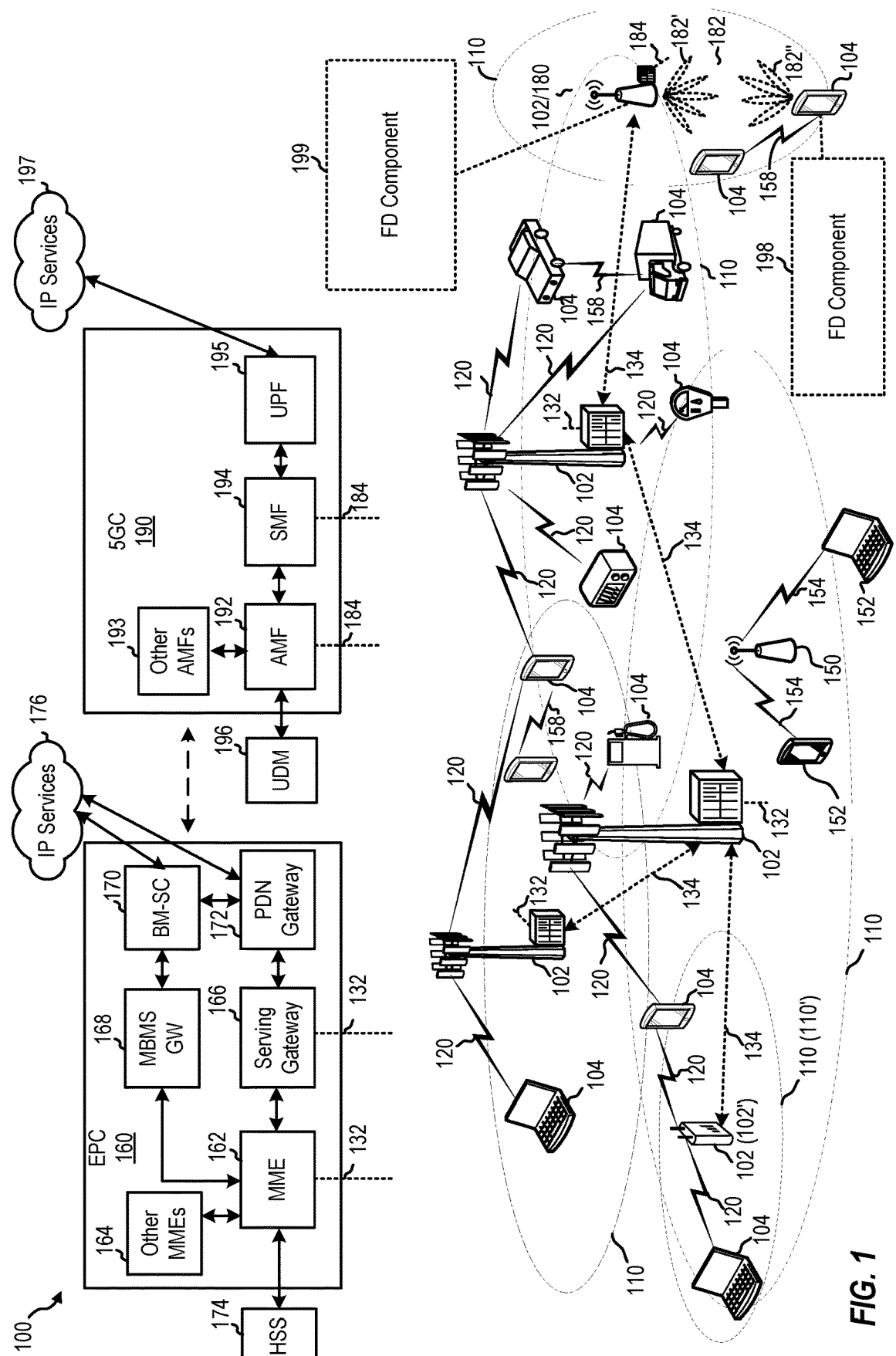
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182''. UE 104 may also transmit a beamformed signal to the base station 180 in one or more transmit directions 182''. Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes full-duplex (FD) component 199, which may be configured to mitigate cross-link interference (CLI) according a set of rules. Wireless network 100 further includes FD component 198, which may also be used to mitigate CLI according to a set of rules.

Figure 2:
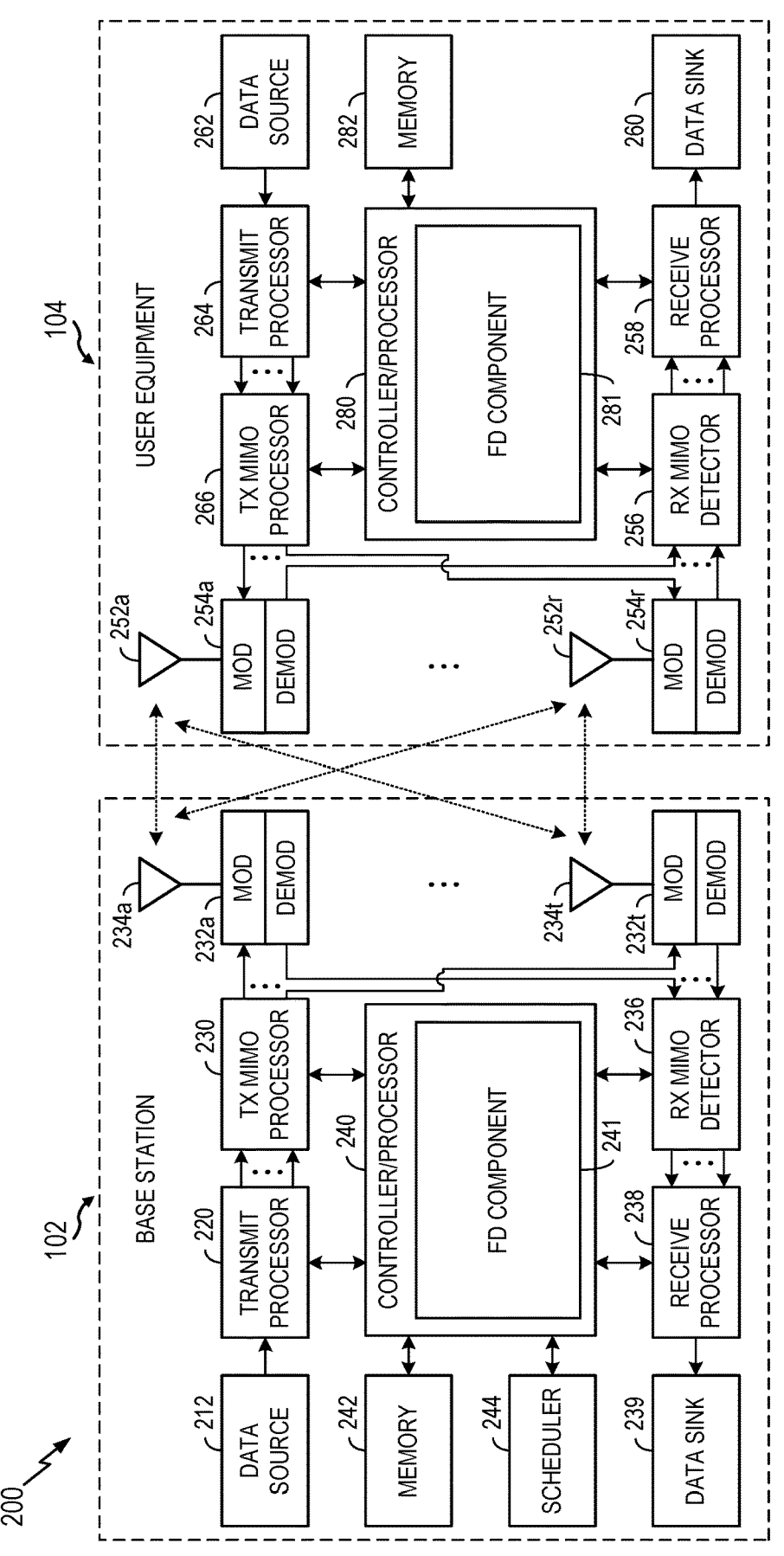
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes FD component 241, which may be representative of FD component 199 of FIG. 1. Notably, while depicted as an aspect of controller/processor 240, FD component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes FD component 281, which may be representative of FD component 198 of FIG. 1. Notably, while depicted as an aspect of controller/processor 280, FD component 281 may be implemented additionally or alternatively in various other aspects of user equipment 104 in other implementations.

Figures 3A, 3B, 3C, 3D:
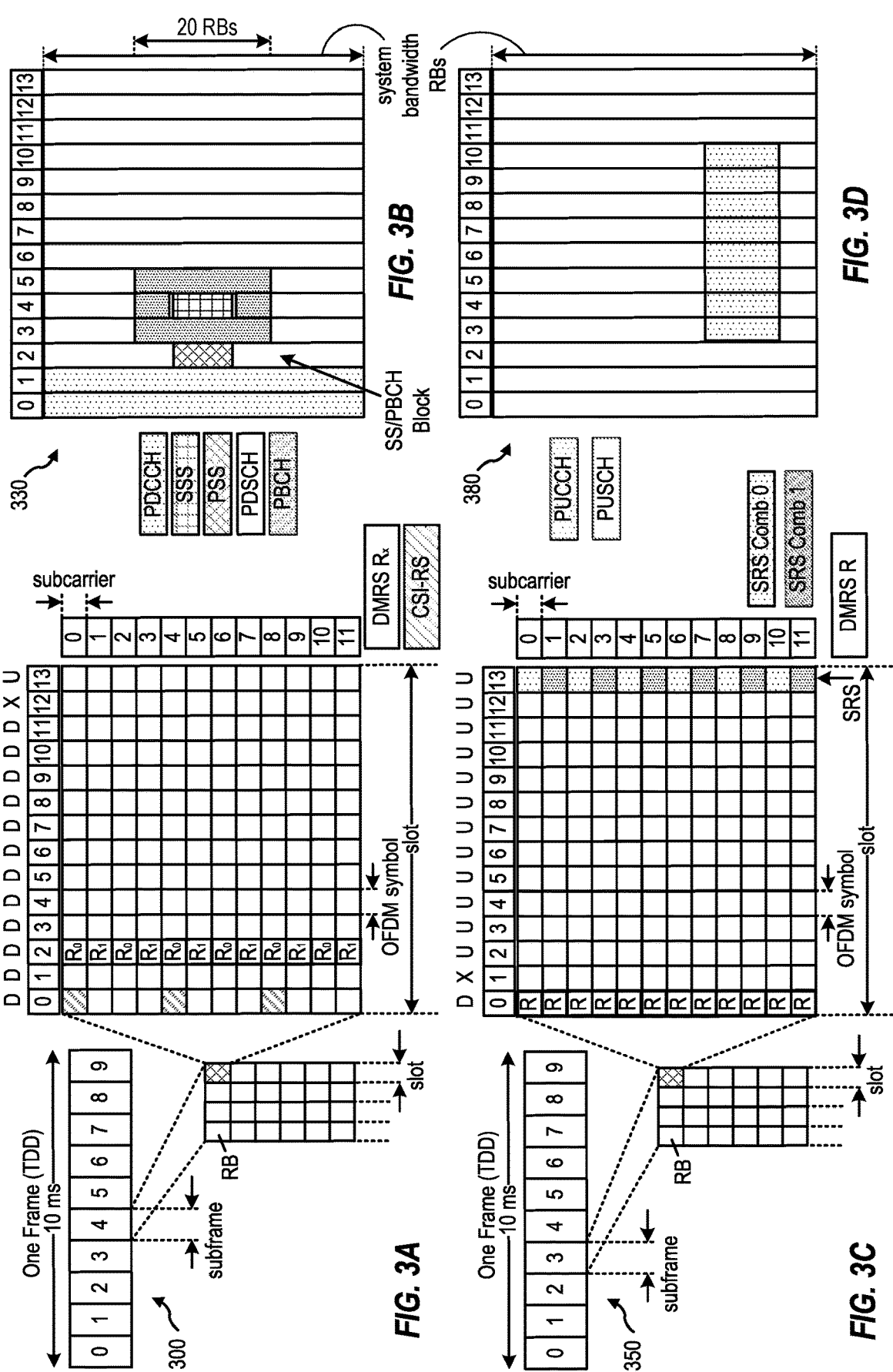
FIG. 3A, FIG. 3B, FIG. 3C, and FIG. 3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Full Duplex Use Cases

Aspects of the present disclosure relate to wireless communications, and more particularly, to techniques that effectively provide a set of rules for mitigating cross-link interference (CLI) for full-duplex (FD) communication.

The techniques presented herein may be applied in various bands utilized for 5G new radio (NR). For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used.

There are various motivations for utilizing FD communications, for example, for simultaneous uplink (UL)/downlink (DL) transmissions in FR2 and different aspects of associated procedures. In some cases, FD capability may enable flexible time division duplexing (TDD) capability and may be present at either the gNB or UE or both. As an example, at the UE, UL transmissions may be sent from one antenna panel (of multiple antenna panels) and DL reception may be performed at another antenna panel. As another example, at the gNB, UL transmissions can be from one panel and DL reception in another panel. As another example, FD may be implemented for integrated access and backhaul (IAB) FD communications.

Both FD and Flexible TTD capability may be conditional on beam separation (e.g., the ability to find transmitter/receiver (Tx/Rx) beam pairs that achieve sufficient separation). Flexible TDD capability may mean, for example, that a UE or base station is able to use Frequency Division Duplex (FDD) on slots conventionally reserved for uplink-only or downlink-only slots (or flexible slots that may be dynamically indicated as either uplink or downlink). Thus, potential benefits of full duplex communications include latency reduction (e.g., it may be possible to receive DL signals in what would conventionally be considered UL only slots, which can enable latency savings), spectrum efficiency enhancements (per cell and/or per UE), and overall more efficient resource utilization.

FIG. 4A, FIG. 4B, and FIG. 4C illustrate example use cases for FD communications.

As illustrated in FIG. 4A, for a first use case (Use Case 1), one UE operating in FD mode may simultaneously communicate with (receive from) a first transmitter receiver point (TRP 1) on the downlink, while transmitting to a second TRP (TRP 2) on the uplink.

As illustrated in FIG. 4B, for a second use case (Use Case 2), one BS operating in FD mode may simultaneously communicate with a first UE (UE 1) on the downlink, while communicating with a second UE (UE 2) on the uplink.

As illustrated in FIG. 4C, for a third use case (Use Case 3), a UE may simultaneously communicate with a BS, transmitting on the uplink while receiving on the downlink (from the same BS).

When FD is disabled for both a gNB and a UE, a network may proceed with legacy half-duplexing (HD) operations. When FD is disabled for a gNB but enabled for a UE, a network may proceed with FD communication according to Use Case 1 for multiple TRPs illustrated in FIG. 4A. When FD is enabled for a gNB, but disabled for a UE, a network may proceed with FD communication according to IAB communication and Use Case 2 illustrated in FIG. 4B. When FD is enabled for both a gNB and a UE, a network may proceed with FD communication according to Use Case 3 illustrated in FIG. 4C.

Interference to a UE and/or gNB operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

Figure 5A:
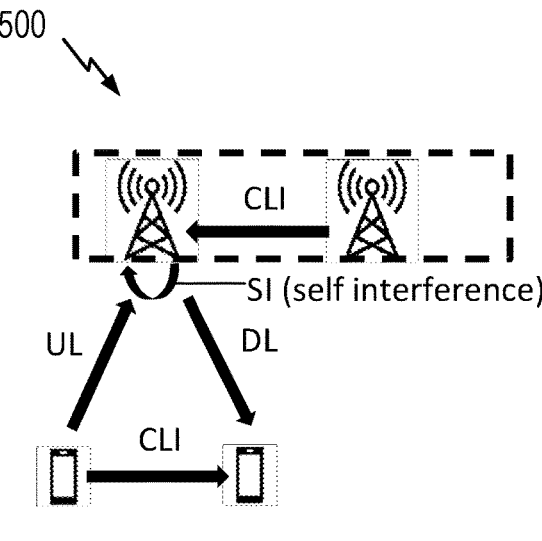
FIG. 5A, FIG. 5B, FIG. 5C, and FIG. 5D depict different interference scenarios occurring during FD communications.

As illustrated in FIG. 5A, a first scenario is when FD is enabled for a gNB but disabled for each connected UE (which in turn may be enabled for half-duplex (HD) communication), a gNB communicates using FD capabilities according to Use Case 2 of FIG. 4B. In this case, CLI between UEs, SI from the FD gNB, and CLI between the gNB and neighboring gNBs interferes with FD communication.

Figure 5B:
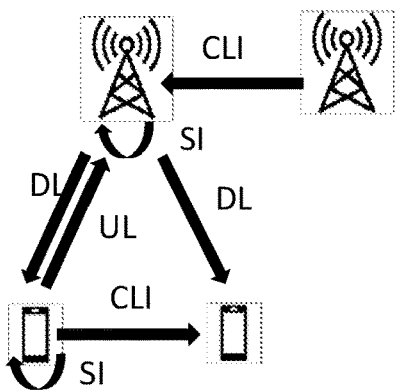

As illustrated in FIG. 5B, a second scenario is when FD is enabled for both a gNB and a FD UE/customer premise equipment (CPE) connected to the gNB, the gNB communicates with the FD UE using FD capabilities according to Use Case 3 of FIG. 4C. If the gNB is connected to a HD UE alongside the FD UE, the gNB communicates with the HD UE according to Use Case 2 of FIG. 4B. In this case, CLI between UEs, SI from the gNB and the FD UE, and CLI between the FD gNB and neighboring gNBs interferes with FD communication.

Figure 5C:
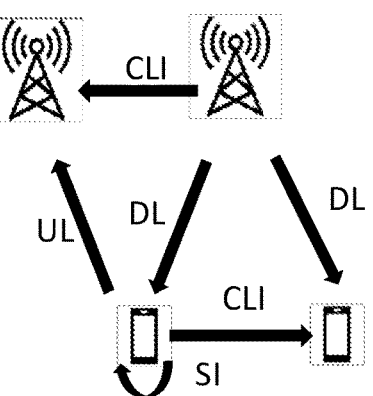

As illustrated in FIG. 5C, a third scenario is when FD is disabled for two gNBs (e.g., in a multiple TRP scenario) and enabled at one UE/CPE connected to the two gNBs, the two gNBs communicate with the FD UE using FD capabilities according to Use Case 1 of FIG. 4A. If one of the two gNBs is connected to a HD UE alongside the FD UE, the one gNB communicates with both the HD UE and the FD UE. In this case, CLI between UEs, SI from the FD UE, and CLI between the two gNBs interferes with FD communication.

Figure 5D:
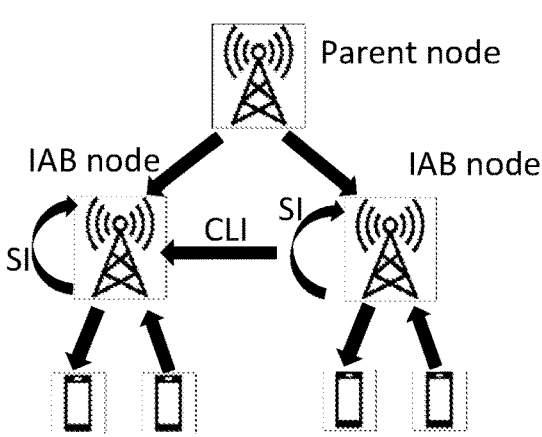

As illustrated in FIG. 5D, a fourth scenario is when two FD IAB nodes have conditional enhanced duplexing capability. Each of the two IAB nodes are connected to a parent node. Each IAB node may be enabled for FD communication and may communicate with at least two UEs according to Use Case 2 of FIG. 4B. In some cases, nodes involved in the FD use case depicted in FIG. 5D may support same frequency full duplex (SFFD) and frequency division multiplexing (FDM)/spatial division multiplexing (SDM) with resource block group (RBG) granularity. In this case, CLI between IAB nodes and SI from each IAB node may interfere with FD communication.

Aspects Related to Mitigating Cross-Link Interference Between gNBs

Aspects of the present disclosure provide apparatuses, methods, processing systems, and computer-readable mediums for mitigating cross-link interference (CLI) between wireless nodes by implementing one or more action rules during full-duplex (FD) communication. The various techniques presented herein may allow for inter-gNB interference management and could help optimize FD and TDD communication sessions.

The techniques may help mitigate CLI, for example, when a gNB communicates in FD mode as illustrated in FIG. 6A or when a gNB communicates in HD mode but with flexible and misaligned TDD, as illustrated in FIG. 6B. CLI (denoted 602) may occur in such cases, for example, when gNB beams are not optimally selected to mitigate inter-gNB interference.

Aspects of the present disclosure may help mitigate inter-gNB in such cases, by providing a set of rules that helps dynamically determine which node should take action to mitigate the interference, when detected or anticipated. The determination may be considered dynamic in the sense that the rules may take into account current operating conditions, such as current uplink and downlink directional configurations and/or the relative priority of potentially interfering transmissions. For example, different nodes may be configured with overlapping slots as flexible. In some cases, these dynamic interference mitigation rules may be defined and implemented for different gNB operators that share same spectrum.

Figure 7:
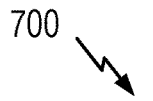
FIG. 7 is a call flow diagram illustrating example signaling between a victim node and aggressor node, where one of the nodes takes actions based on a set of CLI rules.

Example application of the dynamic interference mitigation rules presented herein is illustrated in the call flow diagram 700 of FIG. 7, which shows example message exchange between an aggressor wireless node and a victim wireless node. The victim and aggressor nodes may be any combination of gNBs/TRPs or UEs and may, thus, be configured to mitigate inter-gNB/TRP interference as well as inter-UE interference (e.g., in case UEs belong to different serving gNBs).

In the illustrated example, at 706, the victim node detects CLI (e.g., interference from the aggressor node. The CLI may be detected by any suitable technique, for example, based on the measurement of reference signals (RSs) transmitted by the aggressor wireless node. In some cases, the CLI may be detected based on an indication, received from another node (e.g., that detected CLI based on RS measurements).

In some cases, the victim node may notify the aggressor node of the CLI, as shown at 708. The notification may be via any suitable signaling, such as a wired or wireless backhaul message.

At 710, the aggressor node and/or the victim node determine which node is to take action to mitigate the CLI, based on one or more rules. Based on the determination, the victim node takes action to mitigate CLI at 712a, the aggressor node takes action to mitigate CLI at 712b, or both the victim node and the aggressor node take action.

In some cases, the CLI may be detected on a set of candidate resources (that were candidates for future scheduled transmissions. In such cases, mitigating CLI may involve restricting transmission or reception (Tx/Rx) on a reverse direction on its own candidate restricted resources. The rules may pre-determine which node is to take action based on various conditions, considering different factors.

In one example, the aggressor gNB may forbid a DL transmission from using the high-CLI DL beam in an upcoming time window (that may be subject to CLI). In other words, because of the potentially high directionality of transmissions, not allowing the DL transmission using a downlink beam subject to high CLI, the aggressor gNB may avoid interference to UL reception of a victim gNB.

In another example, a victim gNB may terminate UL reception due to high CLI from a high-priority DL transmission from the aggressor gNB. In either of these examples, interference mitigation may be performed by a gNB for inter-gNB use cases or by a UE for inter-UE use cases (e.g., UEs belong to different serving gNBs).

The interference mitigation rules proposed herein may be designed to determine which gNB should take action to mitigate CLI in a manner designed to optimize the impact on performance. For example, when neighboring gNBs interfere each other, the gNB (e.g., a centralized unit (CU) or a distributed unit (DU)) taking action to forbid reverse link Tx/Rx may be determined based on rules that consider whether OFDM symbols in a slot are configured as downlink (D), uplink (U), or as flexible symbols (F).

Flexible symbols generally refer to symbols that are not dedicated as either downlink or uplink, via a common TDD slot configuration. Slots/symbols may be configured by a network as U, D, or F using cell-specific configuration (tdd-UL-DL-ConfigurationCommon). UE-specific configurations may be used to adjust the slot DL/UL configuration based on current UE needs. In such cases, the network may send a UE-specific slot configuration (e.g., using an IE tdd-UL-DL-ConfigurationDedicated) which modifies the flexible slots and symbols (as U or D).

FIG. 8 illustrates an example table showing rules for gNB interference mitigation action, based on the RRC configured symbols for the aggressor and victim gNBs.

According to interference mitigation rules, in a case where a first gNB has an RRC configured D or U symbol, while a second gNB has F symbol, the gNB having an F symbol may take action to mitigate detected CLI.

For example, as illustrated in the first row of FIG. 8, if an aggressor gNB has an RRC configured D symbol and a victim gNB has a RRC configured F symbol, the victim may mitigate CLI by terminating its DL transmission. As illustrated in the second row, if the aggressor gNB has an RRC configured U symbol and the victim gNB has an RRC configured F symbol, the victim may mitigate CLI by terminating its UL reception.

On the other hand, as illustrated in the third row, if the aggressor gNB has a RRC configured F symbol and the victim gNB has an RRC configured D symbol, the aggressor gNB terminates its DL transmission. As illustrated in the fourth row, if the aggressor gNB has an RRC configured F symbol and the victim gNB has an RRC configured U symbol, the aggressor gNB terminates its UL reception.

In some cases, both gNBs may have an RRC configured F symbol. In such cases, a slot format indicator (SFI) may determine whether the slot is used for UL or DL transmissions. FIG. 9 illustrates an example table showing rules for determining gNB action based on the SFI for each of the aggressor and victim gNBs both having an RRC configured F symbol. If a gNB has SFI indicating "D" for DL transmission or "U" for UL transmission, while the other gNB has no SFI, the gNB without an SFI may take action to mitigate CLI by terminating its Tx/Rx.

As illustrated in the first row of FIG. 9, when an aggressor gNB has an SFI indicating "D" and a victim gNB has no SFI, the victim gNB terminates its DL transmission. As illustrated in the second row, when an aggressor gNB has an SFI indicating "U" and a victim gNB has no SFI, the victim gNB terminates its UL reception. As illustrated in the third row, when an aggressor gNB has no SFI and a victim gNB has an SFI indicating "D", the victim gNB terminates its DL transmission. As illustrated in the fourth row, when an aggressor gNB has no SFI and a victim gNB has an SFI indicating "U", the victim gNB terminates its UL reception.

According to certain aspects of the present disclosure, certain interference mitigation rules determine which gNB takes action to mitigate CLI based on cell identification (cell IDs) associated with each gNB and/or based on priorities assigned to each the gNBs. An example of these cell ID/priority based rules is shown at 1010 in the example call flow diagram 1000 of FIG. 10.

As illustrated, rules based on cell IDs and/or priorities may be applied at both nodes and action(s) take accordingly.

In one example, the gNB that is to terminate Tx/Rx based on cell ID rules may be the one whose involved cell ID is either lower or higher, depending on the specific configuration of the rule. The Cell ID for purposes of applying such a rule may be a serving cell ID or a physical cell identifier (PCI). Alternatively, the gNB taking action may be determined by a pre-configured or randomly generated priority (e.g., per DU/CU).

In some cases, cell ID and/or priority-based rules may be implemented independent of any network condition, including RRC configured symbols for the aggressor and victim gNBs. In some cases, cell ID and/or priority-based rules may be implemented where both the aggressor gNB and the victim gNB have a RRC configured D or U symbol. In some cases, cell ID and/or priority-based rules may be implemented where both the aggressor gNB and the victim gNB have a RRC configured F symbol and either no SFI or configured D/U SFIs.

According to certain aspects of the present disclosure, the interference mitigation rules described herein may be indicated to the victim gNB and/or aggressor gNB. In one case, the rules may be defined in a standard specification (e.g., a NR Release). In another case, either the victim gNB or the aggressor gNB may signal the other gNB its recommendation or intended action (e.g., to forbid reverse link Tx/Rx). The various interference mitigation rules described herein may be applied in various types of aggressor and victim scenarios, such as aggressor and victim gNBs, an aggressor UE/CPE, a victim UE/CPE, an aggressor gNB, or a victim gNB.

Example Methods

FIG. 11 illustrates example operations 1100 for wireless communications by a wireless node, in accordance with certain aspects of the present disclosure. For example, operations 1100 may be performed by a base station (BS) 102 or a user equipment (UE) 104 of FIG. 1 for FD communications.

Operations 1100 begin, at 1110, by detecting cross link interference (CLI) between the first wireless node and a second wireless node.

At 1120, a wireless node may determine whether the first wireless node or the second wireless node is to take action to mitigate CLI based on one or more rules.

At 1130, a wireless taking one or more actions to mitigate CLI when the determination is that the first wireless node is to take action to mitigate CLI.

FIG. 12 illustrates example operations 1200 for wireless communications by a wireless node, in accordance with certain aspects of the present disclosure. For example, operations 1200 may be performed by a BS 102 or a UE 104 of FIG. 1 for FD communications.

Operations 1200 begin, at 1210, by detecting CLI between the first wireless node and a second wireless node.

At 1220, a wireless node may determine whether the first wireless node or the second wireless node is to take action to mitigate CLI based on based on a comparison of a cell identifiers (cell IDs) or physical cell identifiers (PCIs) of the first and second wireless nodes At 1230, a wireless node may take one or more actions to mitigate CLI when the determination is that the first wireless node is to take action to mitigate CLI.

FIG. 13 illustrates example operations 1200 for wireless communications by a wireless node, in accordance with certain aspects of the present disclosure. For example, operations 1200 may be performed by a BS 102 or a UE 104 of FIG. 1 for FD communications.

Operations 1300 begin, at 1310, by detecting cross link interference (CLI) between the first wireless node and a second wireless node;

At 1320, a wireless node may determine whether the first wireless node or the second wireless node is to take action to mitigate CLI based on based on priorities configured for the first and second wireless nodes; and At 1330, a wireless node may take one or more actions to mitigate CLI when the determination is that the first wireless node is to take action to mitigate CLI.

Example Wireless Communication Devices

Figure 14:
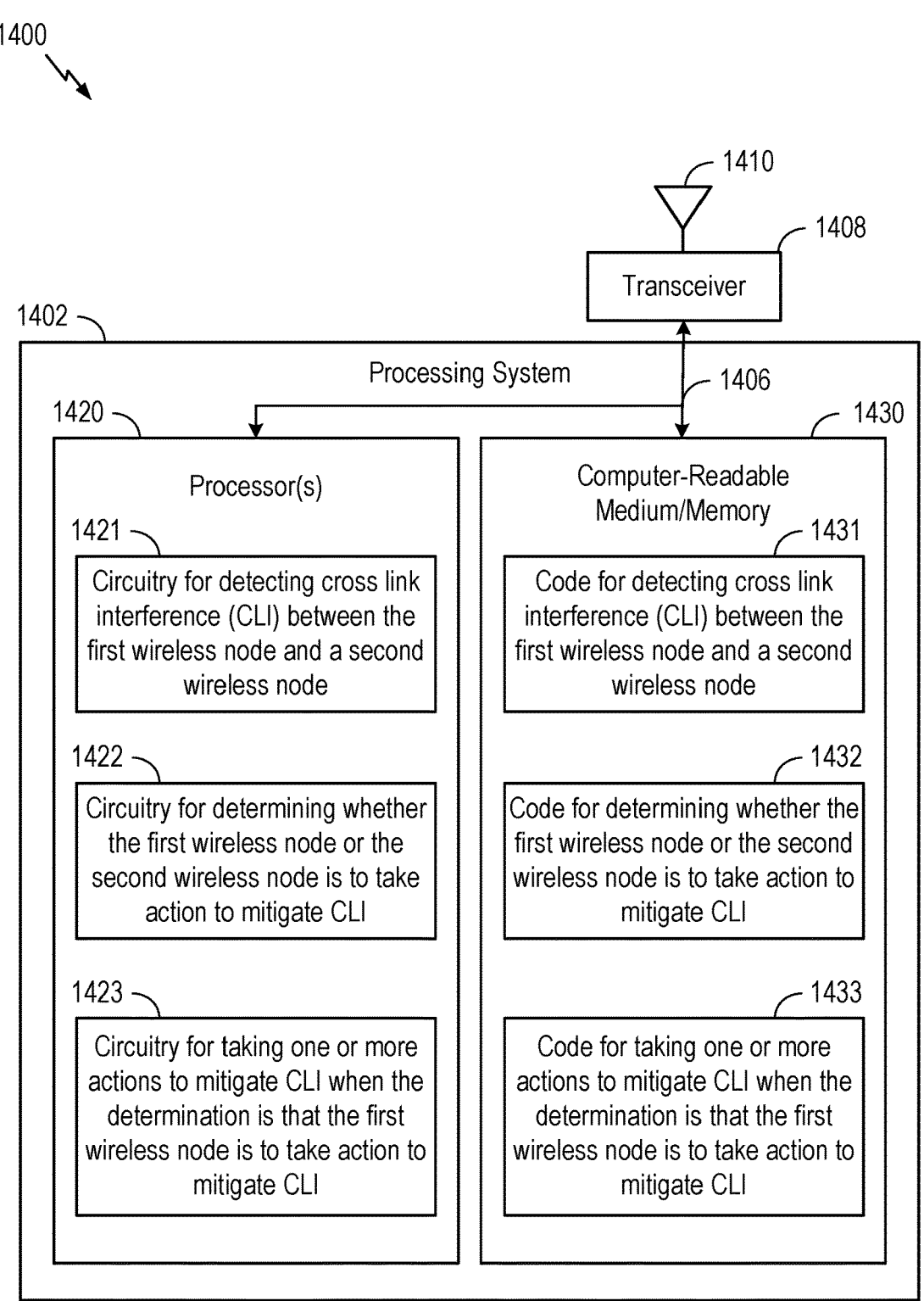
FIG. 14 depicts aspects of an example communications device.

FIG. 14 depicts an example communications device 1400 that includes various components operable, configured, or adapted to perform operations for the techniques disclosed herein, such as the operations depicted and described with respect to FIGS. 11-13. In some examples, communication device 1400 may be a base station 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 11-13, or other operations for performing the various techniques discussed herein for mitigate cross-link interference (CLI) according a set of rules.

In the depicted example, computer-readable medium/memory 1430 stores code 1431 for detecting cross link interference (CLI) between the first wireless node and a second wireless node, code 1432 for determining whether the first wireless node or the second wireless node is to take action to mitigate CLI, and code 1433 for taking one or more actions to mitigate CLI when the determination is that the first wireless node is to take action to mitigate CLI.

In the depicted example, the one or more processors 1420 include circuitry configured to implement the code stored in the computer-readable medium/memory 1430, including circuitry 1421 for detecting cross link interference (CLI) between the first wireless node and a second wireless node, circuitry 1422 for determining whether the first wireless node or the second wireless node is to take action to mitigate CLI, and circuitry 1423 for taking one or more actions to mitigate CLI when the determination is that the first wireless node is to take action to mitigate CLI.

Various components of communications device 1400 may provide means for performing the methods described herein, including with respect to FIGS. 11-13.

In some examples, means for transmitting or sending (or means for outputting for transmission) may include the transceivers 232 and/or antenna(s) 234 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the base station illustrated in FIG. 2 and/or transceiver 1408 and antenna 1410 of the communication device 1400 in FIG. 14.

In some examples, means for detecting, determining, and/or taking action may include various processing system components, such as: the one or more processors 1420 in FIG. 14, or aspects of the base station 102 depicted in FIG. 2, including receive processor 238, transmit processor 220, TX MIMO processor 230, and/or controller/processor 240 (including full-duplexing (FD) component 241).

Notably, FIG. 14 is an example, and many other examples and configurations of communication device 1400 are possible.

Example Clauses

Implementation examples are described in the following numbered clauses:

Clause 1: A method for wireless communication by a first wireless node, comprising detecting cross link interference (CLI) between the first wireless node and a second wireless node, determining whether the first wireless node or the second wireless node is to take action to mitigate the CLI based on one or more rules, and taking one or more actions to mitigate the CLI when the determination is that the first wireless node is to take action to mitigate the CLI.

Clause 2: The method of clause 1, wherein the CLI is detected, by the first wireless node, based on measurements of reference signals (RSs) transmitted by the second wireless node.

Clause 3: The method of clause 2, further comprising transmitting, to the second wireless node, an indication of the detected CLI.

Clause 4: The method of any one of clauses 1-3, wherein the CLI is detected, by the first wireless node, based on: an indication, received from the second wireless node, that the second wireless node detected CLI based on measurements of reference signals (RSs) transmitted by the first wireless node.

Clause 5: The method of any one of clauses 1-4, wherein the first wireless node and the second wireless node comprise a first base station and a second base station, and the one or more actions comprise at least one of restricting uplink reception by the first wireless node or restricting downlink transmission by the first wireless node.

Clause 6: The method of any one of clauses 1-5, wherein the first wireless node comprises a first user equipment (UE) served by a first base station, and the second wireless node comprises a second UE served by a second base station.

Clause 7: The method of any one of clauses 1-6, wherein the one or more rules comprise a rule that dictates that the first wireless node is to take action to mitigate the CLI when the first wireless node is configured with a flexible symbol and the second wireless node is configured with an uplink symbol or a downlink symbol.

Clause 8: The method of clause 7, wherein the one or more rules comprise at least one of a first rule that the first wireless node is to refrain from transmission during the flexible symbol when the second wireless node is configured with a downlink symbol, or a second rule that the first wireless node is to refrain from reception during the flexible symbol when the second wireless node is configured with an uplink symbol.

Clause 9: The method of any one of clauses 1-8, wherein the one or more rules comprise a rule that dictates that the first or second wireless node that is to take action to mitigate the CLI is determined based on a comparison of a cell identifiers (cell IDs) or physical cell identifiers (PCIs) of the first and second wireless nodes when: the first wireless node is configured with a flexible symbol and the second wireless node is configured with an uplink symbol or a downlink symbol, the second wireless node is configured with a flexible symbol and the first wireless node is configured with an uplink symbol or a downlink symbol, the first wireless node is configured with an uplink symbol and the second wireless node is configured with a downlink symbol, the first wireless node is configured with a downlink symbol and the second wireless node is configured with an uplink symbol, or the first wireless node and second wireless node are both configured with flexible symbols.

Clause 10: The method of any one of clauses 1-9, wherein the one or more rules comprise a rule that dictates that the first or second wireless node that is to take action to mitigate the CLI is determined by priorities of the first and second wireless nodes when: the first wireless node is configured with a flexible symbol and the second wireless node is configured with an uplink symbol or a downlink symbol, the second wireless node is configured with a flexible symbol and the first wireless node is configured with an uplink symbol or a downlink symbol, the first wireless node is configured with an uplink symbol and the second wireless node is configured with a downlink symbol, the first wireless node is configured with a downlink symbol and the second wireless node is configured with an uplink symbol, or the first wireless node and second wireless node are both configured with flexible symbols.

Clause 11: The method of clause 10, wherein one of the first wireless node or second wireless node comprises a distributed unit (DU) and the other of the first wireless node or second wireless node comprises a central unit (CU), and the priorities are pre-configured or randomly generated by the DU or the CU.

Clause 12: The method of any one of clauses 1-11, wherein the one or more rules comprise a rule that dictates that, when the first wireless node and second wireless node are both configured with a flexible symbol: the first wireless node is to take action to mitigate the CLI when the second wireless node has received a slot format indicator (SFI) indicating its flexible symbol is an uplink symbol or a downlink symbol and the first wireless node has not received an SFI indicating its flexible symbol is an uplink symbol or a downlink.

Clause 13: The method of any one of clauses 1-12, wherein the one or more rules comprise a rule that dictates that the first or second wireless node that is to take action to mitigate the CLI is determined based on a comparison of a cell identifiers (cell IDs) or physical cell identifiers (PCIs) of the first and second wireless nodes when the first wireless node and second wireless node are both configured with a flexible symbol and neither the first wireless node nor the second wireless node has received an SFI indicating its flexible symbol is an uplink symbol or a downlink.

Clause 14: The method of any one of clauses 1-13, wherein the one or more rules comprise a rule that dictates that the first or second wireless node that is to take action to mitigate the CLI is determined by priorities of the first and second wireless nodes when the first wireless node and second wireless node are both configured with a flexible symbol and neither the first wireless node nor the second wireless node has received an SFI indicating its flexible symbol is an uplink symbol or a downlink.

Clause 15: The method of any one of clauses 1-14, wherein the one or more rules are defined in a standard specification.

Clause 16: The method of any one of clauses 1-15, wherein the one or more rules are based on a recommendation or indication from the second wireless node.

Clause 17: The method of any one of clauses 1-16, further comprising transmitting the second wireless node a recommendation or indication regarding the one or more rules.

Clause 18: A method for wireless communication by a first wireless node, comprising detecting cross link interference (CLI) between the first wireless node and a second wireless node, determining whether the first wireless node or the second wireless node is to take action to mitigate the CLI based on based on a comparison of a cell identifiers (cell IDs) or physical cell identifiers (PCIs) of the first and second wireless nodes, and taking one or more actions to mitigate the CLI when the determination is that the first wireless node is to take action to mitigate the CLI.

Clause 19: A method for wireless communication by a first wireless node, comprising detecting cross link interference (CLI) between the first wireless node and a second wireless node, determining whether the first wireless node or the second wireless node is to take action to mitigate CLI based on priorities configured for the first and second wireless nodes, and taking one or more actions to mitigate the CLI when the determination is that the first wireless node is to take action to mitigate the CLI.

Clause 20: The method of clause 19, wherein one of the first wireless node or second wireless node comprises a distributed unit (DU) and the other of the first wireless node or second wireless node comprises a central unit (CU), and the priorities are pre-configured or randomly generated by the DU or the CU.

Clause 21: An apparatus, comprising: a memory comprising executable instructions; one or more processors configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of mitigating cross-link interference between gNBs by implementing one or more action rules in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first wireless node, comprising:

detecting cross link interference (CLI) between the first wireless node and a second wireless node;

determining whether to take one or more actions to mitigate the CLI based on one or more rules, wherein:

the one or more rules dictate:

which one of the first wireless node or the second wireless node is required to take the one or more actions to mitigate the CLI; and which one of the first wireless node or the second wireless node is not required to take the one or more actions to mitigate the CLI;

the one or more rules comprise a rule that dictates that the one of the first wireless node or the second wireless node that is required to take the one or more actions to mitigate the CLI is to be determined based on at least one of a comparison of a cell identifiers (cell IDs) or physical cell identifiers (PCIs) of the first wireless node and the second wireless node or priorities of the first wireless node and the second wireless node, when the first wireless node and the second wireless node are both configured with a flexible symbol and neither the first wireless node nor the second wireless node has received a slot format indicator (SFI) indicating its flexible symbol is an uplink symbol or a downlink;

the first wireless node and the second wireless node are associated with different network operators sharing a same spectrum;

taking the one or more actions to mitigate the CLI when the determination is that the first wireless node is to take the one or more actions to mitigate the CLI.

2. The method of claim 1, wherein the CLI is detected, by the first wireless node, based on measurements of reference signals (RSs) transmitted by the second wireless node.

3. The method of claim 2, further comprising transmitting, to the second wireless node, an indication of the detected CLI.

4. The method of claim 1, wherein the CLI is detected, by the first wireless node, based on:

an indication, received from the second wireless node, that the second wireless node detected CLI based on measurements of reference signals (RSs) transmitted by the first wireless node.

5. The method of claim 1, wherein:

the first wireless node and the second wireless node comprise a first base station and a second base station; and the one or more actions comprise at least one of restricting uplink reception by the first wireless node or restricting downlink transmission by the first wireless node.

6. The method of claim 1, wherein:

the first wireless node comprises a first user equipment (UE) served by a first base station; and the second wireless node comprises a second UE served by a second base station.

7. The method of claim 1, wherein the one or more rules comprise a rule that dictates that:

the first wireless node is to take the one or more actions to mitigate the CLI when the first wireless node is configured with a flexible symbol and the second wireless node is configured with an uplink symbol or a downlink symbol.

8. The method of claim 7, wherein the one or more rules comprise at least one of:

a first rule that dictates that the first wireless node is to refrain from transmission during the flexible symbol when the second wireless node is configured with a downlink symbol; or a second rule that dictates that the first wireless node is to refrain from reception during the flexible symbol when the second wireless node is configured with an uplink symbol.

9. The method of claim 1, wherein the one or more rules comprise a rule that dictates that the one of the first wireless node or second wireless node that is required to take the one or more actions to mitigate the CLI is to be determined based on a comparison of a cell identifiers (cell IDs) or physical cell identifiers (PCIs) of the first wireless node and the second wireless node when:

the first wireless node is configured with a flexible symbol and the second wireless node is configured with an uplink symbol or a downlink symbol;

the second wireless node is configured with a flexible symbol and the first wireless node is configured with an uplink symbol or a downlink symbol;

the first wireless node is configured with an uplink symbol and the second wireless node is configured with a downlink symbol;

the first wireless node is configured with a downlink symbol and the second wireless node is configured with an uplink symbol; or the first wireless node and second wireless node are both configured with flexible symbols.

10. The method of claim 1, wherein the one or more rules comprise a rule that dictates that the one of the first wireless node or the second wireless node that is required to take the one or more actions to mitigate the CLI is to be determined based on priorities of the first wireless node and the second wireless node when:

the first wireless node is configured with a flexible symbol and the second wireless node is configured with an uplink symbol or a downlink symbol;

the second wireless node is configured with a flexible symbol and the first wireless node is configured with an uplink symbol or a downlink symbol;

the first wireless node is configured with an uplink symbol and the second wireless node is configured with a downlink symbol;

the first wireless node is configured with a downlink symbol and the second wireless node is configured with an uplink symbol; or the first wireless node and second wireless node are both configured with flexible symbols.

11. The method of claim 10, wherein:

one of the first wireless node or second wireless node comprises a distributed unit (DU) and the other of the first wireless node or second wireless node comprises a central unit (CU); and the priorities are pre-configured or randomly generated by the DU or the CU.

12. The method of claim 1, wherein the one or more rules comprise a rule that dictates that, when the first wireless node and second wireless node are both configured with a flexible symbol:

the first wireless node is required to take the one or more actions to mitigate the CLI when the second wireless node has received a slot format indicator (SFI) indicating its flexible symbol is an uplink symbol or a downlink symbol and the first wireless node has not received an SFI indicating its flexible symbol is an uplink symbol or a downlink.

13. The method of claim 1, wherein the one or more rules are defined in a standard specification.

14. The method of claim 1, wherein the one or more rules are based on a recommendation or indication from the second wireless node.

15. The method of claim 1, further comprising transmitting to the second wireless node a recommendation or indication regarding the one or more rules.

16. A method for wireless communication by a first wireless node, comprising:

detecting cross link interference (CLI) between the first wireless node and a second wireless node;

determining, when the first wireless node and the second wireless node are both configured with a flexible symbol and neither the first wireless node nor the second wireless node has received a slot format indicator (SFI) indicating its flexible symbol is an uplink symbol or a downlink, whether to take one or more actions to mitigate the CLI based on a comparison of cell identifiers (cell IDs) or physical cell identifiers (PCIs) of the first and second wireless nodes, wherein:

the comparison of the cell IDs or the PCIs dictates:

which one of the first wireless node or the second wireless node is required to take the one or more actions to mitigate the CLI; and which one of the first wireless node or the second wireless node is not required to take the one or more actions to mitigate the CLI; and the first wireless node and the second wireless node are associated with different network operators sharing a same spectrum; and taking the one or more actions to mitigate the CLI when the determination is that the first wireless node is to take the one or more actions to mitigate the CLI.

17. A method for wireless communication by a first wireless node, comprising:

detecting cross link interference (CLI) between the first wireless node and a second wireless node;

determining, when the first wireless node and the second wireless node are both configured with a flexible symbol and neither the first wireless node nor the second wireless node has received a slot format indicator (SFI) indicating its flexible symbol is an uplink symbol or a downlink, whether the first wireless node or the second wireless node is required to take one or more actions to mitigate CLI based on configured priorities for the first and second wireless nodes, wherein;

the configured priorities dictate:

which one of the first wireless node or the second wireless node is required to take the one or more actions to mitigate the CLI; and which one of the first wireless node or the second wireless node is not required to take the one or more actions to mitigate the CLI; and the first wireless node and the second wireless node are associated with different network operators sharing a same spectrum; and taking one or more actions to mitigate the CLI when the determination is that the first wireless node is to take action to mitigate the CLI.

18. The method of claim 17, wherein:

one of the first wireless node or second wireless node comprises a distributed unit (DU) and the other of the first wireless node or second wireless node comprises a central unit (CU); and the priorities are pre-configured or randomly generated by the DU or the CU.

* * * * *